United States Patent
Cudak et al.

(10) Patent No.: US 11,615,173 B2
(45) Date of Patent: Mar. 28, 2023

(54) SYSTEMS AND METHODS FOR MANAGING REQUESTS TO IMPLEMENT ACCOUNT RELATED ACTIONS BASED ON BIOMETRIC DATA

(71) Applicant: Lenovo Enterprise Solutions (Singapore) Pte. Ltd., New Tech Park (SG)

(72) Inventors: Gary Cudak, Research Triangle Park, NC (US); Nathan Peterson, Research Triangle Park, NC (US); John Petersen, Research Triangle Park, NC (US); Heather Cudak, Research Triangle Park, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 254 days.

(21) Appl. No.: 16/915,054

(22) Filed: Jun. 29, 2020

(65) Prior Publication Data
US 2021/0406348 A1 Dec. 30, 2021

(51) Int. Cl.
*G06F 21/32* (2013.01)
*H04L 67/306* (2022.01)
*G06V 40/40* (2022.01)

(52) U.S. Cl.
CPC .............. *G06F 21/32* (2013.01); *G06V 40/40* (2022.01); *H04L 67/306* (2013.01)

(58) Field of Classification Search
None
See application file for complete search history.

(56) References Cited

U.S. PATENT DOCUMENTS

| | | | | |
|---|---|---|---|---|
| 10,489,789 | B1* | 11/2019 | Gerling-Ospina | ...... H04L 67/55 |
| 11,120,450 | B1* | 9/2021 | Buckingham | ........ G06Q 20/385 |
| 2015/0324579 | A1* | 11/2015 | Qian | ...................... H04L 63/083 |
| | | | | 726/6 |
| 2015/0350177 | A1* | 12/2015 | Sharp | .................... G06Q 20/321 |
| | | | | 726/6 |
| 2016/0232518 | A1* | 8/2016 | Butler, IV | ............ G06Q 20/367 |
| 2016/0253651 | A1* | 9/2016 | Park | ...................... G06Q 20/322 |
| | | | | 705/39 |
| 2017/0193622 | A1* | 7/2017 | Rosado | ................... G08B 21/22 |

(Continued)

OTHER PUBLICATIONS

Coonce, S., "The Most Expensive Lesson of My Life: Details of SIM port hack," May 20, 2019, https://medium.com/coinmonks/the-most-expensive-lesson-of-my-life-details-of-sim-port-hack-35de11517124 (captured Jun. 29, 2020).

*Primary Examiner* — Phirin Sam
(74) *Attorney, Agent, or Firm* — Olive Law Group, PLLC

(57) ABSTRACT

Systems and methods for managing requests to implement account related actions based on biometric data are disclosed herein. According to an aspect, a system includes a first computing device comprising a user account manager configured to manage an account of a user. The user account manager is also configured to receive a request to implement an action associated with the account. Further, the user account manager is configured to receive, from a second computing device of the user, biometric data associated with the user. The user account manager is also configured to manage the request to implement the action based on the received biometric data.

20 Claims, 4 Drawing Sheets

(56) References Cited

U.S. PATENT DOCUMENTS

| | | | | |
|---|---|---|---|---|
| 2017/0351812 A1* | 12/2017 | Green | ............... | B60W 50/14 |
| 2019/0035042 A1* | 1/2019 | Attar | ................. | G07C 9/257 |
| 2020/0026397 A1* | 1/2020 | Wohlstadter | .......... | G16C 20/10 |
| 2020/0076813 A1* | 3/2020 | Felice-Steele | ........ | H04L 63/083 |
| 2020/0349580 A1* | 11/2020 | Gerling-Ospina | ...... | H04L 67/20 |
| 2021/0027291 A1* | 1/2021 | Ranganathan | .......... | G06F 9/451 |
| 2021/0136063 A1* | 5/2021 | Cheek | ............... | H04W 12/12 |
| 2021/0344672 A1* | 11/2021 | Drechsler | .......... | H04L 63/0838 |

* cited by examiner

SYSTEMS AND METHODS FOR MANAGING REQUESTS TO IMPLEMENT ACCOUNT RELATED ACTIONS BASED ON BIOMETRIC DATA

TECHNICAL FIELD

The presently disclosed subject matter relates generally to accounts of computing device users. Particularly, the presently disclosed subject matter relates to systems and methods for managing requests to implement account related actions based on biometric data.

BACKGROUND

People often have various accounts that may be accessed via their computing devices. For example, a person may use a computer or smartphone to access and manage financial account, a social media account, an email account, or the like. These accounts may be accessed by an application or web browser residing on a computing device. Frequently, these accounts require the user to enter credentials, such as username and password, in order to access the account.

Increased security for accessing online account, particularly accounts having personal data such as financial accounts, is needed as cybercrime becomes more sophisticated. Many accounts also require another layer of authentication referred to as two-factor authentication or 2FA. With 2FA, a user enters a username and password for an account at one computing device. The, rather than gaining immediate access to the account, the user will be required to provide an additional piece of information, such as an answer to a present secret question or a personal identification number (PIN). In another common example, the system may send a code to a previously-identified computing device of the user such as a smartphone. The code may text the code to the smartphone, and this code may be entered to complete a final step for accessing the account.

One problem with the 2FA procedure of sending a code to a smartphone is that there are now many techniques that can be used to impersonate a user's smartphone, such as cloning and SIM porting. By use of an impersonation technique, an unauthorized user may receive the code to circumvent this step of the 2FA procedure. In view of these difficulties, there is a need for improved systems techniques to safeguard user accounts.

BRIEF DESCRIPTION OF THE DRAWINGS

Figure 1:
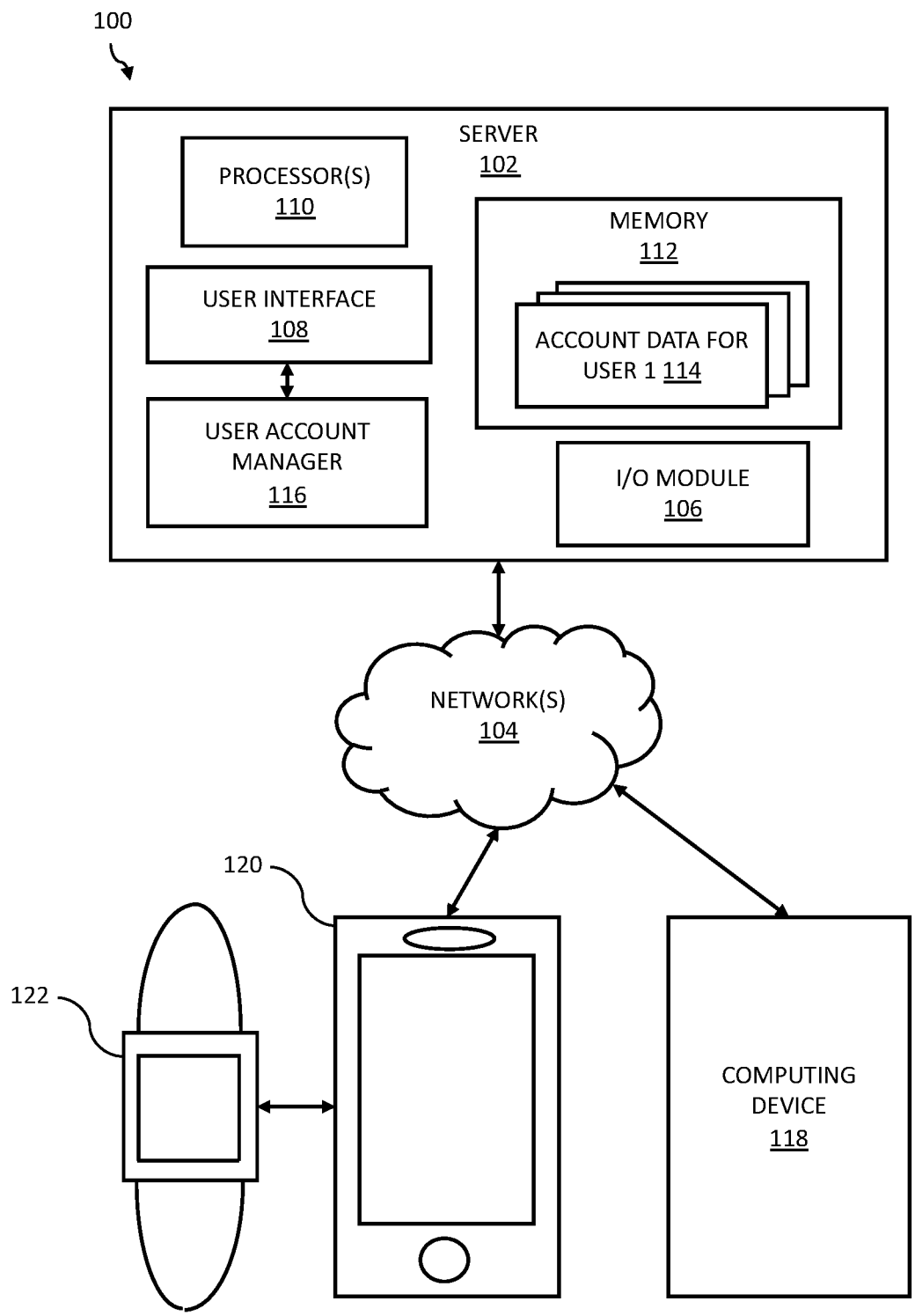
Figure 2:
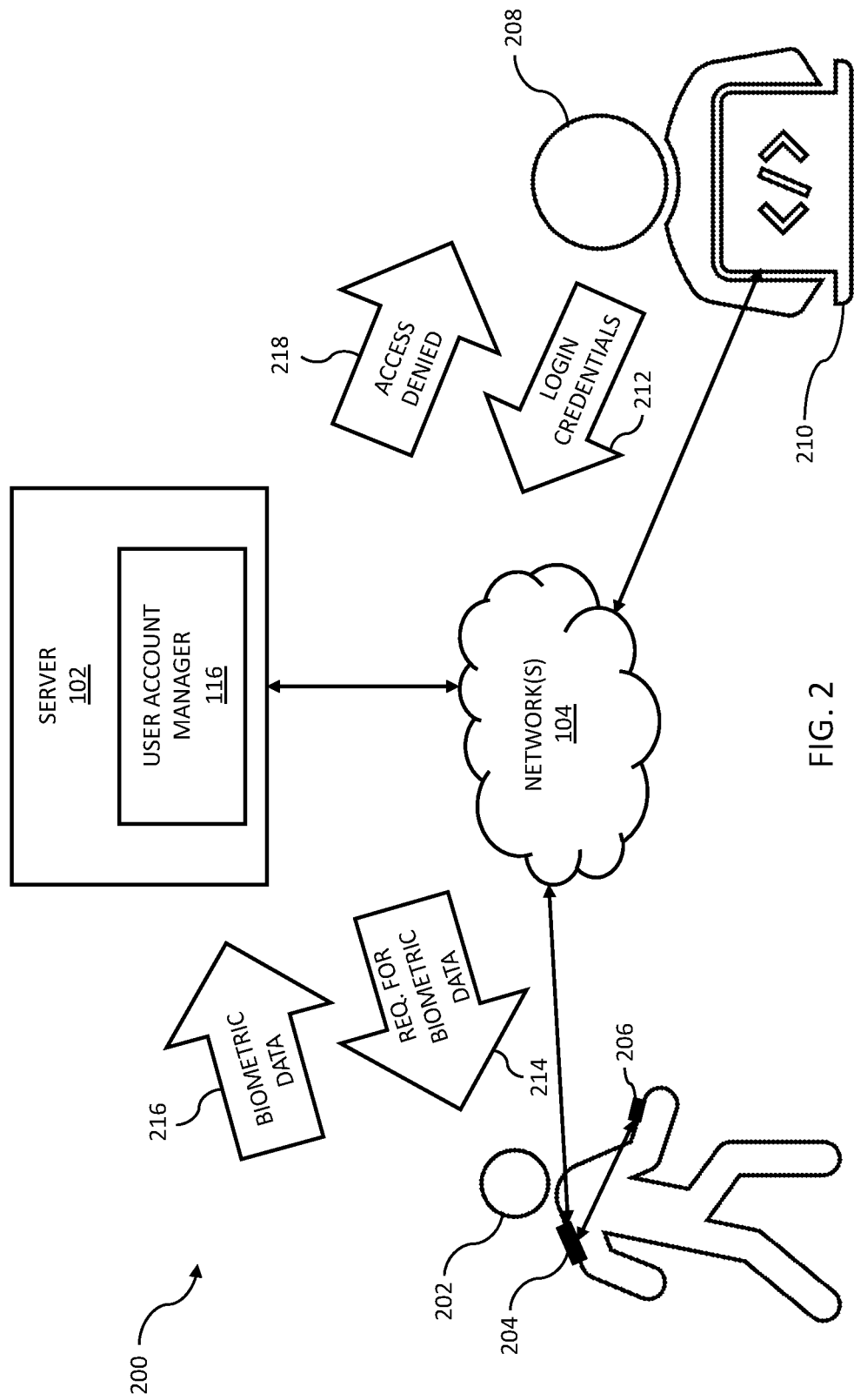
Figure 3:
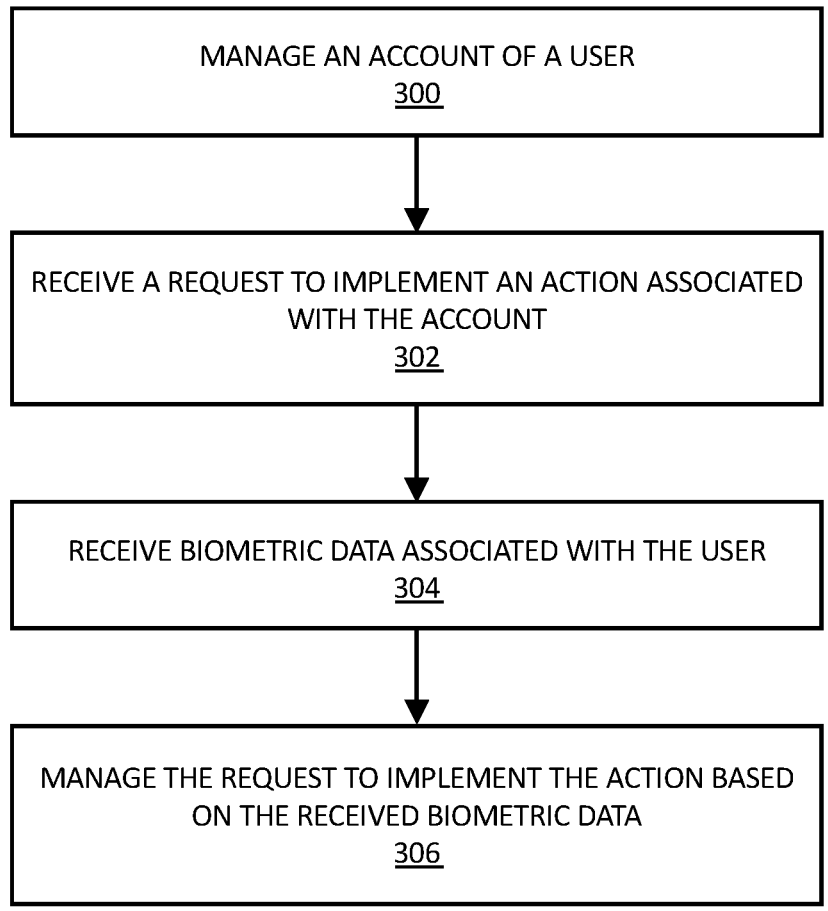
Figure 4:
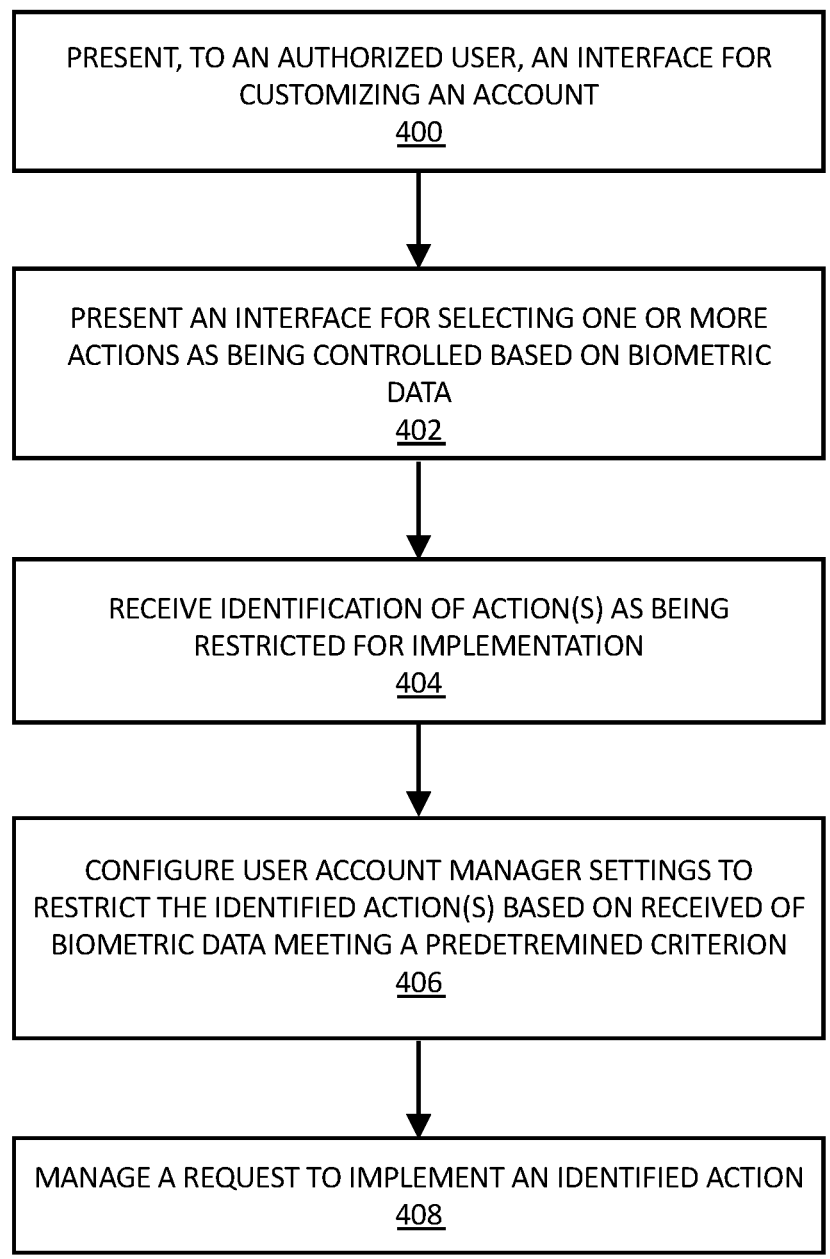

Having thus described the presently disclosed subject matter in general terms, reference will now be made to the accompanying Drawings, which are not necessarily drawn to scale, and wherein:

FIG. 1 is a block diagram of a system for managing requests to implement requested actions based on biometric data in accordance with embodiments of the present disclosure;

FIG. 2 is a diagram of another system for managing requests to implement requested actions based on biometric data in accordance with embodiments of the present disclosure;

FIG. 3 is a flow diagram of a method for managing requests to implement requested actions based on biometric data in accordance with embodiments of the present disclosure; and FIG. 4 is a flow diagram of a method for managing requests to implement requested actions based on biometric data in accordance with embodiments of the present disclosure.

SUMMARY

The presently disclosed subject matter relates to systems and methods for managing requests to implement account related actions based on biometric data. According to an aspect, a system includes a first computing device comprising a user account manager configured to manage an account of a user. The user account manager is also configured to receive a request to implement an action associated with the account. Further, the user account manager is configured to receive, from a second computing device of the user, biometric data associated with the user. The user account manager is also configured to manage the request to implement the action based on the received biometric data.

According to another aspect, a method includes receiving, from a first computing device, a request to implement an action associated with an account of a user. The method also includes receiving, from a second computing device, biometric data associated with the user. Further, the method includes managing the request to implement the action based on the received biometric data.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACK-BERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smartwatches, smartphones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a block diagram of a system 100 for managing requests to implement requested actions based on biometric data in accordance with embodiments of the present disclosure. Referring to FIG. 1, the system 100 includes a server 102 operable to communicate with multiple computing devices via one or more communications networks 104. The server 102 is operable to provide various network-based services to users of the computing devices. For example, a user may use his or her computer or smartphone to log into an account managed by the server 102. Example accounts include, but are not limited to, a financial account, a social media account, a cloud computing account, an email account, an ecommerce account, a home security account, and the like. A user may use login credentials, such as a username and password, to log into his or her account for requesting implementation of actions associated with the account. Example account actions include, but are not limited to, accessing data in the account, managing account profile information, updating security information for the account, or the like. The server 102 may include a user interface 108 configured to receive user input received via the network(s) 104 from users of other computing devices. The user inputs may be requests for actions associated with a respective account.

The server 102 may include an input/output (I/O) module 106 configured to interface with the network(s) 104 for communication with other computing devices, such as computing devices of users having accounts. The server 102 also includes one or more processors 110 and memory 112 for implementing the functionality of the server 102 described herein. Memory 112 may store account data 114 for each user (e.g., Users 1-N). Example account data for each user includes, but is not limited to, name, address information, email address(es), telephone number(s), social security number, financial information, login information, security-related information, and the like.

The server 102 includes a user account manager 116 configured to manage account of each user. Further, the user account manager 116 may be configured to receive a request to implement actions associated with accounts. Example actions include, but are not limited to, resetting an account, changing a predetermined setting of an account (e.g., a login setting), changing a login setting of an account, retrieving predetermined data from an account, and the like. An authorized user may utilize a computing device to communicate requests to the server 102 for accessing data 114 in an account and for requesting actions associated with the account. The user account manager 116 may receive the requests and implement the actions.

In accordance with embodiments, a user's request for implementing action may be managed based on biometric data received from the user. The user account manager 116 may restrict one or more requested actions for an account unless biometric data is provided that meets criterion or criteria. For example, one or more actions may be identified as being restricted for implementation. For these identified actions, the user account manager 116 may restrict these actions unless qualifying biometric data is received by a user. For example, an action may be a request for logging into an account. In this example, the user account manager 116 may require biometric data from the user in order to determine whether the user is in a state of sleeping, driving, or exertion (e.g., exercising). In response to determining that the user is in one of these states based on the biometric data, the user account manager 116 may prevent the requester from logging into the account.

In an example scenario, the server 102 may manage a website through which account data 114 may be accessed and actions implemented that are associated with the user accounts. A user at a computing device 118 may use a web browser on the computing device 118 to access the website. The server 102 may require login information to log into a user account. At a login webpage of the website, the user at the computing device 118 may successfully enter login information (e.g., username and password) for a particular account. As a subsequent step, the user account manager 116 may also require receipt biometric data that meets criterion or criteria before permitting the user at the computing device 118 to access the account. In response to successful entry of the login information, the user account manager 116 may communicate a request to an identified computing device 120, which is a smartphone in this example, for biometric data. For example, the data 114 of the requested account may include an identifier (e.g., phone number) of the computing device 120 where biometric data of the user of the requested account can be obtained. The computing device 120 may be in communication with a smartwatch 122 via a wireless connection (e.g., BLUETOOTH® wireless communication) or other suitable communication technique. The smartwatch 122 may be configured to monitor the heartrate of its user and to report the heartrate reading of the user to the smartphone 120. The smartphone 120 may subsequently communicate the heartrate reading to the server 102 for receipt by the user account manager 116. Subsequently, the user account manager 116 can analyze the heartrate reading to determine whether the user is in a state in which login is restricted. For example, the user account manager 116 may determine, based on the heartrate reading, that the user is in sleeping state or an exertion state. In response to determining that the heartrate reading indicates the user is in a sleeping state or an exertion state, the user account manager 116 can prevent further access to the account by the user at the computing device 118. This is because it may be deduced that the requester at computing device 118 is not the actual user of the account because the biometric data received from the identified device 120 indicates a sleeping state or an exertion state. In response to determining that the heartrate reading indicates the user is not in a sleeping state or an exertion state, then the user at the computing device 118 may be permitted to login because proper login credentials were provided and biometric data meeting the criteria was received.

FIG. 2 illustrates a diagram of another system 200 for managing requests to implement requested actions based on biometric data in accordance with embodiments of the present disclosure. Referring to FIG. 2, the server 102 is configured to maintain a financial account of a user 202. In this example, the financial account is a bank account of the user 202. The server 102 is a web server that is configured to enable the user 202 to log into the account via a web browser to access a website for viewing account data such as financial account balances and transaction information. Further, the user 202 may use the browser to interact with the website for conducting financial transactions, such as wire transactions. The user 202 may gain access to his or her account by inputting login information (e.g., username and password). Also, in accordance with embodiments, biometric data acquired from the user 202 may be needed to verify that the user is in an expected state (i.e., not sleeping, not driving, or not exerting himself or herself at a high level) for interacting with his or her account.

With continuing reference to FIG. 2, the user 202 is carrying a smartphone 204 and a smartwatch 206. Particularly, the smartphone 204 is attached to the user's 202 upper arm, and the smartwatch 206 is strapped to a wrist of the user 202. The user 202 can be considered to be at a high level of exertion due to hiking in this example. The smartwatch 206 is reading the user's 202 heartrate and storing the heartrate data in the smartphone 204. The smartwatch 206 may communicate the heartrate data to the smartphone 204 via direct wireless communication. The smartphone 204 may be communicatively connected to the server 102 via the network(s) 104.

Another user 208 may be using a desktop computer 210 to attempt unauthorized access to the user's 202 account on the server 102 while the user 202 is hiking. Particularly, the other user 208 may have misappropriated or otherwise obtained user's 202 username and password and used these login credentials to attempt access to the account. As depicted by an arrow 212, login credentials may be communicated to the server 102 via the network(s) 104.

The server 102 may receive the login credentials communication 212. The user account manager 116 may verify whether the login and password in the communication 212 match credentials for an account. In this example, the user account manager 116 may determine that the login and password match the account of user 202, thus verifying the provided login and password. In response to verifying the login and password, the user account manager 116 may communicate a request 214 to the smartphone 204, which is identified as being associated with the user 202. The smartphone 204 may send a message 216 including its stored heartrate readings to the server 102 in response to the request 214. Subsequently, the user account manager 116 can analyze the heartrate reading and determine that the user 202 is currently at a high level of exertion. In response to determining that the user is in an exertion state, the user account manager 116 can prevent further access to the account by the user 208 at the computing device 210. Further, the server 102 may send a message 218 to the desktop computer 210 to indicate that access to the account is denied. Thus, unauthorized access to the account by the user 208 is prevented due to the determined state of the user 202 based on the biometric data.

FIG. 3 illustrates a flow diagram of a method for managing requests to implement requested actions based on biometric data in accordance with embodiments of the present disclosure. It is noted that the method is described by example as being implemented by the server 102 shown in FIG. 1, although it should be understood that the method may be implemented by any suitable computing device or system. More particularly, the method is described as being implemented by the user account manager 116 shown in FIG. 1. The user account manager 116 may be include hardware, software, firmware, or combinations thereof configured to implement the functionality described herein. For example, the user account manager 116 may be implemented by one or more processors and memory (e.g., memory 108 and processor(s) 110 shown in FIG. 1).

Now turning to FIG. 3, the method includes managing 300 an account of a user. Referring to FIG. 1 for example, the user account manager 116 can manage account of multiple users. The users may each use a web browser on their respective computing device to access an account with data 114 stored by the server 102. The user account manager 116 may control user access to accounts, maintenance of accounts, and actions with respect to the accounts.

The method of FIG. 3 includes receiving 302 a request to implement an action associated with the account. Continuing the aforementioned example, the user of the computing device 118 may enter input for transferring funds from the user's financial account to another's financial account. The user account manager 116 may receive the input for requesting the transfer of funds. This type of action may be designated as a type requiring biometric data to indicate the state of the actual user in order to proceed with implementation of the action. The user account manager 116 may determine that the request to transfer of funds requires biometric data verification. In response to the determination, the user account manager 116 may communicate a message to a computing device of the user of the account for requesting the biometric data. In this example, the smartphone 120 is identified as a verified computing device of the user of the account, and therefore the user account manager 116 sends the request for biometric data to the smartphone 120.

The method of FIG. 3 includes receiving 304, from a second computing device, biometric data associated with the user. Continuing the aforementioned example, the smartphone 120 may receive the request for biometric data. In response to receipt of the request, the smartphone 120 may send to the server 102 stored biometric data. The biometric data may be data acquired by the smartphone 120 and/or acquired by the smartwatch 122.

The method of FIG. 3 includes managing 306 the request to implement the action based on the received biometric data. Continuing the aforementioned example, the user account manager 116 may receive the biometric data sent by the smartphone 120. The biometric data may indicate a current state of the user. For example, the state of the user may be that the user is either sleeping, driving, exercising (or otherwise at a high level of exertion, or not in one of the aforementioned states. In response to determining that the user is either sleeping, driving, or exercising, the user account manager 116 can deny the request to transfer funds. This is because it can be deduced that the authorized user of the account is likely in a state in which she or he would not request the transfer of funds, and likely the request is unauthorized. On the other hand, in response to determining that the user is not in a state of sleeping, driving, or exercising, the user account manager 116 may permit the request to transfer funds and subsequently implement the request. This is because it can be deduced that the authorized user is at least not in a state in which requesting the action would be unlikely. As an example, an action may be "whitelisted" or "blacklisted" based on the biometric state.

FIG. 4 illustrates a flow diagram of a method for managing requests to implement requested actions based on biometric data in accordance with embodiments of the present disclosure. It is noted that the method is described by example as being implemented by the server 102 shown in FIG. 1, although it should be understood that the method may be implemented by any suitable computing device or system. More particularly, the method is described as being implemented by the user account manager 116 shown in FIG. 1.

Referring to FIG. 4, the method includes presenting 400, to an authorized user, an interface for customizing an account. For example referring to FIG. 1, the authorized user may own or otherwise have proper access to use the computing device 118, the smartphone 120, and the smartwatch 122. In this example, the account is a security account for managing the home security system of the user. When setting up her or his account for the home security system, the server 102 may present a webpage to the authorized user for inputting profile information (e.g., name, codes for door entry, passwords, street address, email address, telephone numbers, etc.). The authorized user may use a browser residing on the computing device 118 to display and interact with the webpage.

The method of FIG. 4 includes presenting 402 an interface for selecting one or more actions as being controlled based on biometric data. Continuing the aforementioned example, the server 102 may also present a webpage via the browser for the authorized user to select one or more actions as being controlled based on the user's biometric data. For example, the authorized user at computing device 118 may select from the actions presented via a browser on the computing device 118. Example actions for the home security system include, but are not limited to, updating login credentials, changing codes or passwords, viewing images and video captured by cameras, alarm contact information, and alarm settings.

The method of FIG. 4 includes receiving 404 identification of action(s) as being restricted for implementation. Continuing the aforementioned example, the authorized user may use the computing device's browser to identify one or more of the actions as being restricted for implementation. For example, the user may select that the actions of updating login credentials and changing codes or passwords are restricted for implementation unless proper biometric data meeting a predetermined criterion is provided.

The method of FIG. 4 includes configuring 406 user account manager settings to restrict the identified action(s) based on receipt of biometric data meeting a predetermined criterion. Continuing the aforementioned example, user account manager settings for the authorized user's account may be stored as data 114 in memory 112. The settings may indicate the actions that were identified by the authorized user as requiring biometric data meeting a predetermined criterion before being implemented.

The method of FIG. 4 includes managing 408 a request to implement an identified action. Continuing the aforementioned example, a request to implement an identified action with the authorized user account may be received by the user account manager 116. The user account manager 116 may determine that the request is associated with an action identified by the authorized. The user account manager 116 may subsequently handle the request in accordance with a setting for the identified action. For example, the user account manager 116 may request biometric data and determine whether the received biometric data meets the predetermined criterion for implementing the action or preventing the action from being implemented.

In an example scenario, actions may be restricted or limited based on biometric data. For example, a user may set an email account to reject all forms of reset or access attempts in response to determining that the received biometric data indicates that the user is sleeping.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:
1. A system comprising:
a first computing device comprising a user account manager configured to:
manage an account of a user;
receive a request to implement an action associated with the account;

receive, from a second computing device of the user, biometric data associated with the user, wherein the biometric data indicates an active state of the user; and manage the request to implement the action based on the indicated active state of the user.

2. The system of claim 1, wherein the account is one of the user's financial account, social media account, cloud computing account, email account, and ecommerce account.

3. The system of claim 1, wherein the request is one of a request to reset the account, to change a predetermined setting of the account, to change a login setting of the account, and to retrieve data from the account.

4. The system of claim 1, wherein the biometric data includes one of a temperature reading of the user, a heart rate reading of the user, a sound reading of the user, and image capture data associated with the user.

5. The system of claim 1, wherein the indicated active state is one of a state of sleeping, a state of driving, or a state of exertion based on the biometric data,
wherein the user account manager is configured to:
determine whether the user is in the state of sleeping, the state of driving, or the state of exertion based on the biometric data; and
prevent implementation of the requested action and/or locking the account based on determining that the user is in the state of sleeping, the state of driving, or the state of exercising.

6. The system of claim 1, wherein the user account manager is configured to:
implement a plurality of actions with respect to the user's account;
identify one or more of the actions as being restricted for implementation; and
restrict the one or more actions based on the received biometric data.

7. The system of claim 6, wherein the user account manager is configured to remove the restriction in response to receipt of predetermined authorization.

8. The system of claim 6, wherein the second computing device is one of a mobile computing device, a smartphone, a tablet computer, a laptop computer, a wearable device, and a smartwatch.

9. The system of claim 1, wherein the first computing device further comprises a user interface configured to receive user input that indicates the action.

10. The system of claim 9, wherein the user interface is configured to receive user input that indicates to restrict the action based on the received biometric data, and
wherein the user account manager is configured to restrict the action based on receipt of the biometric data meeting a predetermined criterion.

11. The system of claim 1, wherein the user account manager is configured to restrict implementation of the action based on the received biometric data meeting a predetermined criterion.

12. The system of claim 11, wherein the predetermined criterion comprises a heartrate of the user exceeding a predetermined level.

13. A method comprising:
receiving, from a first computing device, a request to implement an action associated with an account of a user;
receiving, from a second computing device, biometric data associated with the user, wherein the biometric data indicates an active state of the user; and
managing the request to implement the action based on the indicated active state of the user.

14. The method of claim 13, wherein the request is one of a request to reset the account, to change a predetermined setting of the account, to change a login setting of the account, and to retrieve data from the account.

15. The method of claim 13, wherein the biometric data includes one of a temperature reading of the user, a heart rate reading of the user, a sound reading of the user, and image capture data associated with the user.

16. The method of claim 13, wherein the indicated active state is one of a state of sleeping, a state of driving, or a state of exertion based on the biometric data,
wherein the method further comprises:
determining whether the user is in the state of sleeping, the state of driving, or the state of exertion based on the biometric data; and
preventing implementation of the requested action and/or locking the account based on determining that the user is in the state of sleeping, the state of driving, or the state of exercising.

17. The method of claim 13, further comprising:
implementing a plurality of actions with respect to the user's account;
identifying one or more of the actions as being restricted for implementation; and
restricting the one or more actions based on the received biometric data.

18. The method of claim 13, further comprising:
receiving user input that indicates to restrict the action based on the received biometric data; and
restricting the action based on receipt of the biometric data meeting a predetermined criterion.

19. The method of claim 13, further comprising restricting implementation of the action based on the received biometric data meeting a predetermined criterion.

20. The method of claim 19, wherein the predetermined criterion comprises a heartrate of the user exceeding a predetermined level.

* * * * *